(12) United States Patent
Minz et al.

(10) Patent No.: US 8,429,426 B2
(45) Date of Patent: Apr. 23, 2013

(54) SECURE PIPELINE MANAGER

(75) Inventors: Leonid Minz, Beersheba (IL); Avraham Meir, Rishon Lezion (IL); Boris Dolgunov, Ramat Gan (IL); Roy Krotman, Rishon Lezion (IL)

(73) Assignee: SanDisk IL Ltd., Kfar Saba (IL)

( * ) Notice: Subject to any disclaimer, the term of this patent is extended or adjusted under 35 U.S.C. 154(b) by 502 days.

(21) Appl. No.: 12/253,414

(22) Filed: Oct. 17, 2008

(65) Prior Publication Data

US 2009/0113146 A1    Apr. 30, 2009

(30) Foreign Application Priority Data

Oct. 30, 2007  (IL) .......................................... 187043

(51) Int. Cl.
*G06F 12/14* (2006.01)

(52) U.S. Cl.
USPC ........... 713/193; 713/153; 713/161; 713/310; 713/320; 713/324; 380/30

(58) Field of Classification Search .................. 713/153, 713/161, 310, 320–324; 380/30
See application file for complete search history.

(56) References Cited

U.S. PATENT DOCUMENTS

| | | | |
|---|---|---|---|
| 6,195,739 B1 * | 2/2001 | Wright et al. .................... | 712/19 |
| 6,820,203 B1 | 11/2004 | Okaue et al. | |
| 7,047,339 B2 * | 5/2006 | Oakley ........................... | 710/303 |
| 7,055,029 B2 * | 5/2006 | Collins et al. .................. | 713/161 |
| 7,107,459 B2 * | 9/2006 | Caronni et al. ................ | 713/190 |
| 7,380,130 B2 * | 5/2008 | England et al. ................ | 713/189 |
| 7,464,280 B2 * | 12/2008 | Morris et al. ................. | 713/323 |
| 2002/0186838 A1 * | 12/2002 | Brandys .......................... | 380/30 |
| 2003/0115447 A1 * | 6/2003 | Pham et al. .................... | 713/153 |
| 2004/0039928 A1 * | 2/2004 | Elbe et al. ...................... | 713/189 |
| 2004/0105541 A1 | 6/2004 | Elbe et al. | |
| 2004/0148495 A1 * | 7/2004 | Elbe et al. ...................... | 712/220 |
| 2004/0148536 A1 | 7/2004 | Zimmer et al. | |
| 2006/0229979 A1 * | 10/2006 | Sato et al. ...................... | 705/39 |
| 2006/0242429 A1 * | 10/2006 | Holtzman et al. ............. | 713/189 |
| 2007/0033364 A1 * | 2/2007 | Maeda et al. .................. | 711/170 |
| 2007/0078548 A1 * | 4/2007 | May et al. ...................... | 700/94 |

FOREIGN PATENT DOCUMENTS

| EP | 1043860 | 10/2000 |
|---|---|---|
| WO | WO-03027816 | 4/2003 |

OTHER PUBLICATIONS

International Search Report and Written Opinion for PCT/IL2008/001392, dated Feb. 18, 2009, 11 pages.
International Preliminary Report on Patentability for PCT/IL2008/001392, dated May 14, 2010, 6 pages.

* cited by examiner

*Primary Examiner* — Christopher J Brown
*Assistant Examiner* — Fahimeh Mohammadi
(74) *Attorney, Agent, or Firm* — Brinks Hofer Gilson & Lione

(57) ABSTRACT

A method for data storage includes supplying data to and from a host to a storage memory via a secure data path. A first CPU is employed to control operation of the storage memory, and a second CPU is employed to control operation of the secure data path.

5 Claims, 3 Drawing Sheets

SECURE PIPELINE MANAGER

FIELD OF THE INVENTION

The present invention relates to data storage devices generally and more particularly to data storage devices including a secure data path.

BACKGROUND OF THE INVENTION

Single chip cryptographic processors are typically provided for performing operations in cryptographic applications. A cryptographic processor includes a central processing unit for controlling a plurality of coprocessors, where each coprocessor includes a control unit, an arithmetic unit and a bus for connecting each coprocessor to the central processing unit.

SUMMARY OF THE INVENTION

Some embodiments of the present invention seeks to provide improved data storage devices including a secure data path.

There is thus provided in accordance with a preferred embodiment of the present invention a data storage device including a storage memory, a secure data path between the storage memory and a host, a first central processing unit (CPU) controlling operation of at least the storage memory and a second CPU controlling operation of the secure data path.

Preferably, the secure data path includes at least two crypto-processors. Additionally, the at least two crypto-processors contain secret keys and the second CPU has access to the secret keys and the first CPU does not have access to the secret keys. Additionally or alternatively, the crypto-processors include software including at least one algorithm contained in the following set of algorithms: AES (Advanced Encryption Standard), DES (Data Encryption Standard), 3DES (Triple DES), SHA1 (Secure Hash Algorithm 1), SHA256 (Secure Hash Algorithm 256), SHA384 (Secure Hash Algorithm 384), SHA512 (Secure Hash Algorithm 512), RC4 (Rivest Cipher 4).

Preferably, a first of the at least two crypto-processors transfers data to a second of the at least two crypto-processors via a random access memory (RAM) memory. Preferably, a first of the at least two crypto-processors transfers data to a second of the at least two crypto-processors via a data processing module.

Preferably, the second CPU employs computational power of the first CPU. Preferably, the second CPU consumes less power than the first CPU. Preferably, the second CPU is in operation when the first CPU is in an idle mode.

Preferably, the data storage device is operative to simultaneously process multiple data streams along the secure data path. Additionally, different data streams of the multiple data streams include different combinations of algorithms. Additionally or alternatively, different data streams of the multiple data streams utilize different secret keys.

There is also provided in accordance with another preferred embodiment of the present invention a data storage device including a storage memory, a storage memory manager, a host interface, a first CPU controlling operation of at least the storage memory, a secure data path between the storage memory and the host interface and a second CPU controlling operation of the secure data path, the secure data path containing secret keys and the second CPU having access to the secret keys and the first CPU not having access to the secret keys.

Preferably, the secure data path includes software including at least one algorithm contained in the following set of algorithms: AES (Advanced Encryption Standard), DES (Data Encryption Standard), 3DES (Triple DES), SHA1 (Secure Hash Algorithm 1), SHA256 (Secure Hash Algorithm 256), SHA384 (Secure Hash Algorithm 384), SHA512 (Secure Hash Algorithm 512), RC4 (Rivest Cipher 4).

Preferably, the second CPU employs computational power of the first CPU. Preferably, the second CPU consumes less power than the first CPU. Preferably, the second CPU is in operation when the first CPU is in an idle mode.

There is further provided in accordance with yet another preferred embodiment of the present invention a method for data storage including supplying data to and from a host to a storage memory via a secure data path, employing a first CPU to control operation of the storage memory and employing a second CPU to control operation of the secure data path.

Preferably, the secure data path includes software including at least one algorithm contained in the following set of algorithms: AES (Advanced Encryption Standard), DES (Data Encryption Standard), 3DES (Triple DES), SHA1 (Secure Hash Algorithm 1), SHA256 (Secure Hash Algorithm 256), SHA384 (Secure Hash Algorithm 384), SHA512 (Secure Hash Algorithm 512), RC4 (Rivest Cipher 4).

There is yet further provided in accordance with still another preferred embodiment of the present invention a method for data storage including providing a data storage device including a storage memory, a storage memory manager, a host interface, a secure data path between the host interface and the storage memory and first and second CPUs, supplying data to and from a host to the storage memory via the secure data path, employing the first CPU to control operation of the storage memory and employing the second CPU to control operation of the secure data path.

Preferably, the second CPU has access to secret keys required to control operation of the secure data path and the first CPU does not have access to the secret keys.

BRIEF DESCRIPTION OF THE DRAWING

The present invention will be understood and appreciated more fully from the following detailed description taken in conjunction with the drawing in which.

DETAILED DESCRIPTION OF A PREFERRED EMBODIMENT

Figure 1:
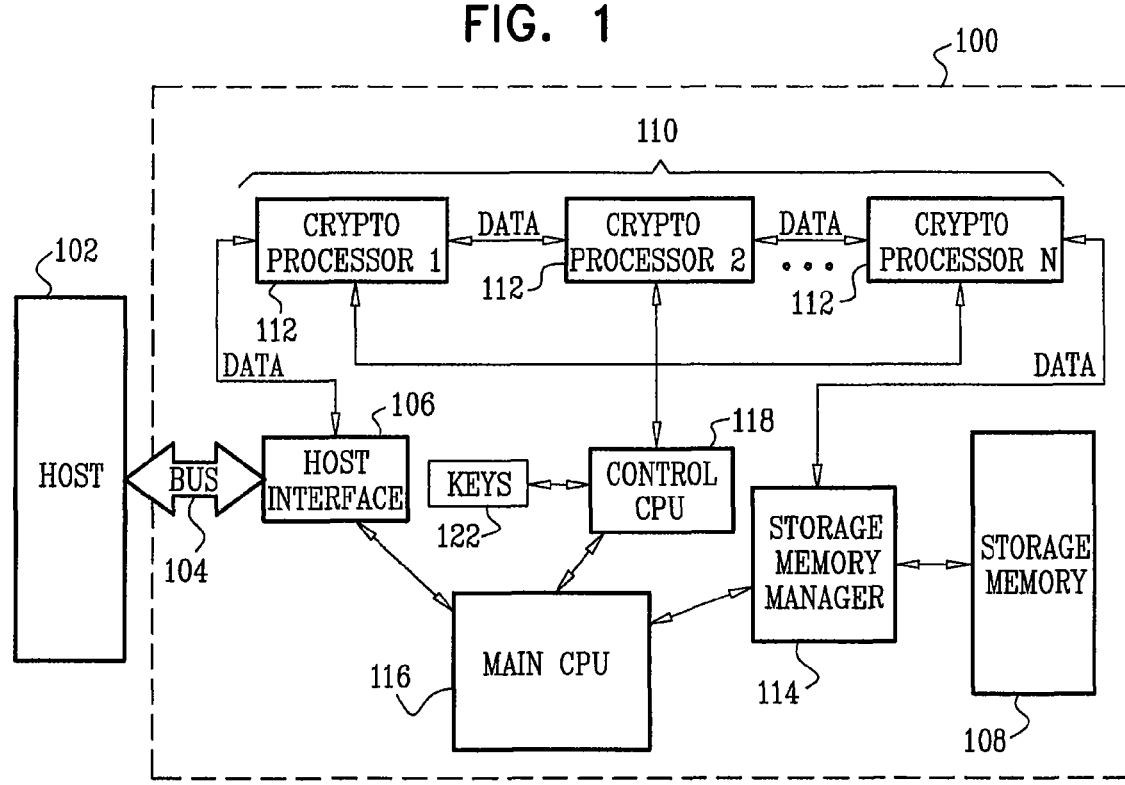
FIG. 1 is a simplified block diagram illustration of a data storage device constructed and operative in accordance with a preferred embodiment of the present invention.

Reference is now made to FIG. 1, which is a simplified block diagram illustration of a data storage device constructed and operative in accordance with a preferred embodiment of the present invention. As seen in FIG. 1, a data storage device 100 communicates with a host 102 via a data bus 104 and a host interface 106, forming part of data storage device 100.

Data is communicated between the host interface 106 and a storage memory 108 via a secure data path 110, preferably including a plurality of crypto-processors 112, and via a storage memory manager 114. The operation of the data storage device 100 is governed by a main CPU 116. It is a particular feature of the present invention that a dedicated control CPU 118 controls the secure data path 110 generally and more particularly controls the operation of the crypto-processors 112.

As seen in the embodiment of FIG. 1, different crypto-processors 112 are preferably operative to transfer data directly to each other.

It is appreciated that the crypto-processors 112 may include any suitable software implementing any suitable algorithm. In accordance with a preferred embodiment of the present invention, the crypto-processors 112 include software including at least one algorithm contained in the following set of algorithms: AES (Advanced Encryption Standard), DES (Data Encryption Standard), 3DES (Triple DES), SHA1 (Secure Hash Algorithm 1), SHA256 (Secure Hash Algorithm 256), SHA384 (Secure Hash Algorithm 384), SHA512 (Secure Hash Algorithm 512), RC4 (Rivest Cipher 4).

It is an advantage of the present invention that new crypto combinations may be readily installed by changes in software in the crypto-processors 112.

An additional advantage of the present invention is overall decreased power consumption inasmuch as the control CPU 118 can be substantially smaller than the main CPU 116. During much of the time that the control CPU 118 is in operation, the main CPU 116 may be in an idle mode and not consume any appreciable amount of power. As appropriate, CPU 118 can employ computing power of CPU 116.

In cases where the software installed in the crypto-processors 112 includes secret keys 122, only control CPU 118 has access to the secret keys 122 and the main CPU 116 does not have such access, thus increasing the security level of the data storage device 100.

As described herein, control CPU 118 is preferably operative to provide one or more of the following functionalities: synchronization between different crypto-processors 112, time scheduling for each of crypto-processors 112, initialization of each of crypto-processors 112 and management of secret keys 122.

It is appreciated that the secure data path 110 of data storage device 100 is not limited to a single data stream and may be operative to simultaneously process multiple data streams. Thus, multiple applications of host 102 may each open a data stream to access portions of storage memory 108 allocated to that application. Storage memory manager 114 is preferably operative to control data accesses of each data stream to storage memory 108. It is appreciated that each data stream may include a different combination of algorithms and different secret keys 122 may be utilized by each algorithm/data stream combination.

It is further appreciated that control CPU 118 is also preferably operative to optimize the utilization of crypto-processors 112, such as by giving a higher priority to relatively slower crypto-processors 112 than relatively faster crypto-processors 112. Additionally, control CPU 118 may be operative to control a crypto-processor 112 so that a functionality included therein is executed multiple times, if required, using the same or different secret keys 122.

Figure 2:
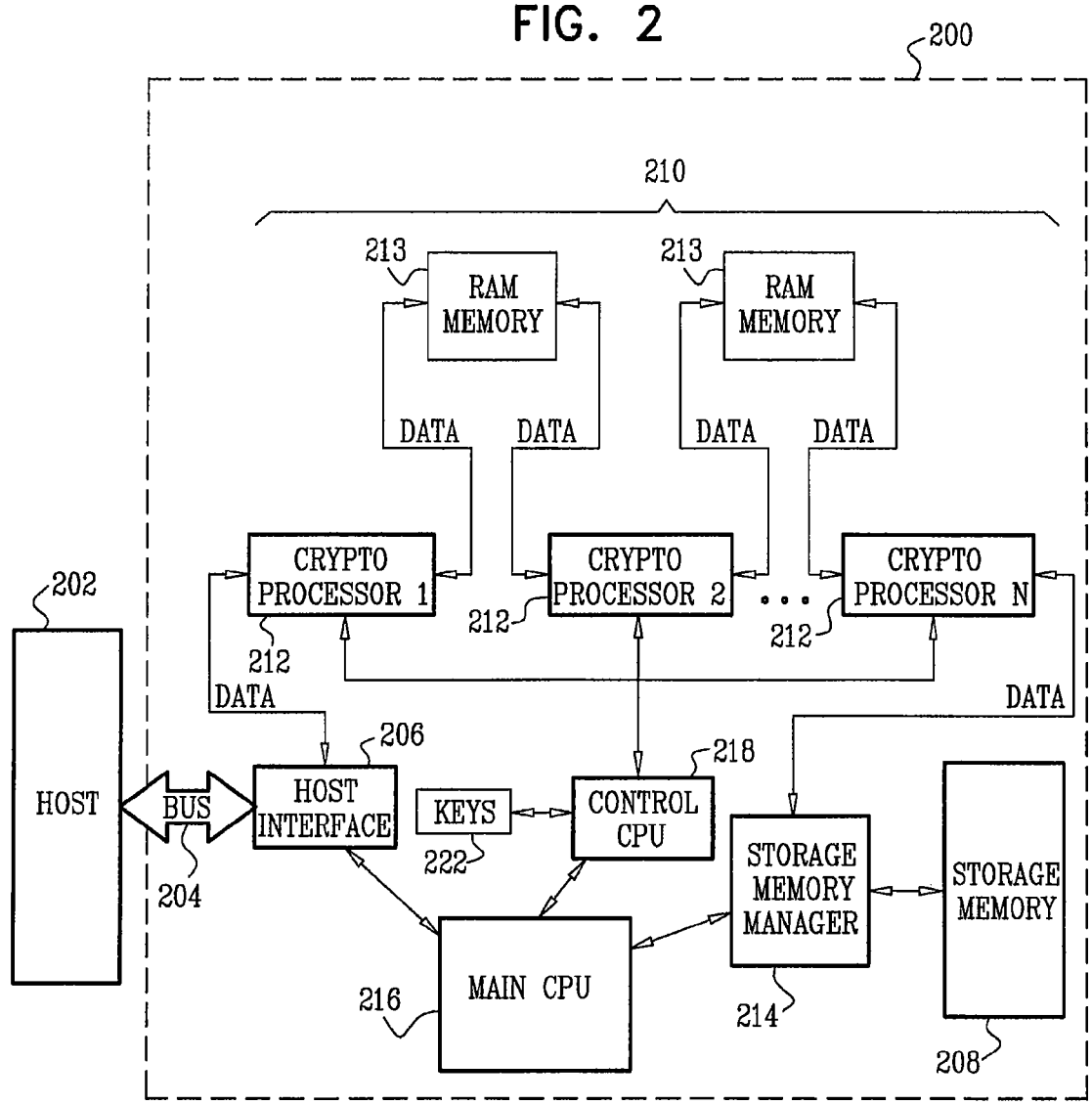
FIG. 2 is a simplified block diagram illustration of a data storage device constructed and operative in accordance with another preferred embodiment of the present invention.

Reference is now made to FIG. 2, which is a simplified block diagram illustration of a data storage device constructed and operative in accordance with another preferred embodiment of the present invention. As seen in FIG. 2, a data storage device 200 communicates with a host 202 via a data bus 204 and a host interface 206, forming part of data storage device 200.

Data is communicated between the host interface 206 and a storage memory 208 via a secure data path 210, preferably including a plurality of crypto-processors 212 and RAM memories 213, and via a storage memory manager 214. The operation of the data storage device 200 is governed by a main CPU 216. It is a particular feature of the present invention that a dedicated control CPU 218 controls the secure data path 210 generally and more particularly controls the operation of the crypto-processors 212 and RAM memories 213.

As seen in the embodiment of FIG. 2, different crypto-processors 212 are preferably operative to transfer data to each other via RAM memories 213, such that each data transfer includes a write to memory from a first crypto-processor 212 and a read from memory by a second crypto-processor 212. In this embodiment, control CPU 218 is preferably operative to allocate memory for each of crypto-processors 212.

It is appreciated that the crypto-processors 212 may include any suitable software implementing any suitable algorithm. In accordance with a preferred embodiment of the present invention, the crypto-processors 212 include software including at least one algorithm contained in the following set of algorithms: AES (Advanced Encryption Standard), DES (Data Encryption Standard), 3DES (Triple DES), SHA1 (Secure Hash Algorithm 1), SHA256 (Secure Hash Algorithm 256), SHA384 (Secure Hash Algorithm 384), SHA512 (Secure Hash Algorithm 512), RC4 (Rivest Cipher 4).

It is an advantage of the present invention that new crypto combinations may be readily installed by changes in software in the crypto-processors 212.

An additional advantage of the present invention is overall decreased power consumption inasmuch as the control CPU 218 can be substantially smaller than the main CPU 216. During much of the time that the control CPU 218 is in operation, the main CPU 216 may be in an idle mode and not consume any appreciable amount of power. As appropriate, CPU 218 can employ computing power of CPU 216.

In cases where the software installed in the crypto-processors 212 includes secret keys 222, only control CPU 218 has access to the secret keys 222 and the main CPU 216 does not have such access, thus increasing the security level of the data storage device 200.

As described herein, control CPU 218 is preferably operative to provide one or more of the following functionalities: synchronization between different crypto-processors 212, time scheduling for each of crypto-processors 212, management of memories 213, allocation of memory to each of crypto-processors 212, initialization of each of crypto-processors 212 and management of secret keys 222.

It is appreciated that the secure data path 210 of data storage device 200 is not limited to a single data stream and may be operative to simultaneously process multiple data streams. Thus, multiple applications of host 202 may each open a data stream to access portions of storage memory 208 allocated to that application. Storage memory manager 214 is preferably operative to control data accesses of each data stream to storage memory 208. It is appreciated that each data stream may include a different combination of algorithms and different secret keys 222 may be utilized by each algorithm/data stream combination.

It is further appreciated that control CPU 218 is also preferably operative to optimize the utilization of crypto-processors 212, such as by giving a higher priority to relatively slower crypto-processors 212 than relatively faster crypto-processors 212. Additionally, control CPU 218 may be operative to control a crypto-processor 212 so that a functionality included therein is executed multiple times, if required, using the same or different secret keys 222.

Figure 3:
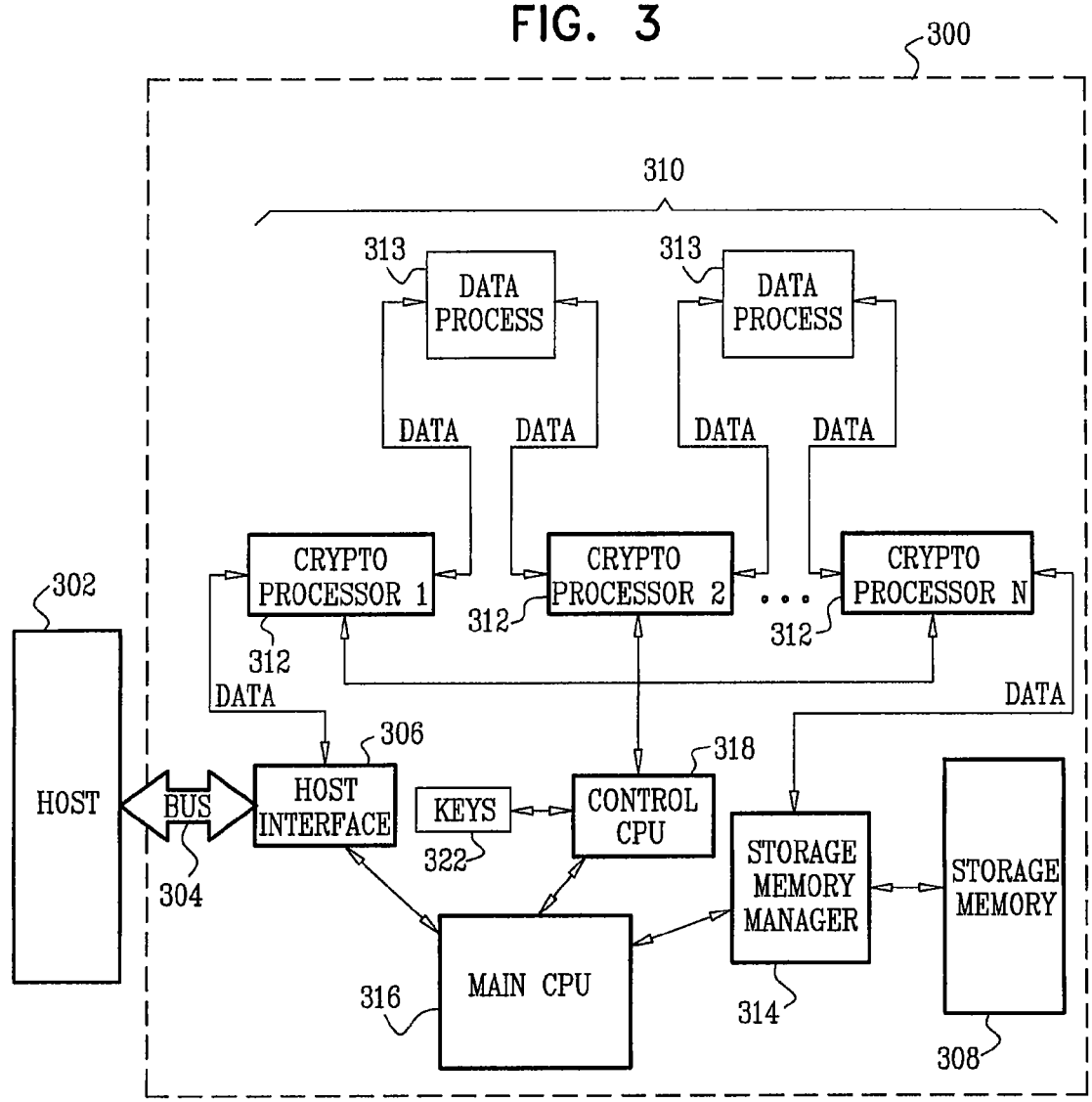
FIG. 3 is a simplified block diagram illustration of a data storage device constructed and operative in accordance with yet another preferred embodiment of the present invention.

Reference is now made to FIG. 3, which is a simplified block diagram illustration of a data storage device constructed and operative in accordance with yet another preferred embodiment of the present invention. As seen in FIG. 3, a data storage device 300 communicates with a host 302 via a data bus 304 and a host interface 306, forming part of data storage device 300.

Data is communicated between the host interface 306 and a storage memory 308 via a secure data path 310, preferably including a plurality of crypto-processors 312 and data processing modules 313, and via a storage memory manager 314. The operation of the data storage device 300 is governed by a main CPU 316. It is a particular feature of the present invention that a dedicated control CPU 318 controls the secure data path 310 generally and more particularly controls the operation of the crypto-processors 312 and data processing modules 313.

As seen in the embodiment of FIG. 3, different crypto-processors 312 are preferably operative to transfer data to each other via processing modules 313, which typically include additional data processing, such as encrypting/decrypting or encoding/decoding. It is appreciated that the processing performed by processing module 313 may also change the volume of the data being transferred between different crypto-processors 312. In this embodiment, control CPU 318 is preferably operative to allocate processing time between crypto-processors 312 based on the different volumes of data that need to be processed by each of crypto-processors 312. Thus, for example, if a specific data processing module 313 is operative to decode a file and thereby increase its volume, control CPU 318 may be operative to allocate a greater percentage of the total processing time available to a crypto-processor 312 downstream from the decoding processing module 313, which must process the larger decoded file, and to allocate a smaller percentage of the total processing time available to a crypto-processor 312 upstream from the decoding processing module 313, which must process the smaller, undecoded file.

It is appreciated that crypto-processors 312 may include any suitable software implementing any suitable algorithm. In accordance with a preferred embodiment of the present invention, the crypto-processors 312 include software including at least one algorithm contained in the following set of algorithms: AES (Advanced Encryption Standard), DES (Data Encryption Standard), 3DES (Triple DES), SHA1 (Secure Hash Algorithm 1), SHA256 (Secure Hash Algorithm 256), SHA384 (Secure Hash Algorithm 384), SHA512 (Secure Hash Algorithm 512), RC4 (Rivest Cipher 4).

It is an advantage of the present invention that new crypto combinations may be readily installed by changes in software in the crypto-processors 312.

An additional advantage of the present invention is overall decreased power consumption inasmuch as the control CPU 318 can be substantially smaller than the main CPU 316. During much of the time that the control CPU 318 is in operation, the main CPU 316 may be in an idle mode and not consume any appreciable amount of power. As appropriate, CPU 318 can employ computing power of CPU 316.

In cases where the software installed in the crypto-processors includes secret keys 322, only control CPU 318 has access to the secret keys 322 and the main CPU 316 does not have such access, thus increasing the security level of data storage device 300.

As described herein, control CPU 318 is preferably operative to provide one or more of the following functionalities: synchronization between different crypto-processors 312, time scheduling for each of crypto-processors 312, management of data processing modules 313, allocation of processing time to each of crypto-processors 312, initialization of each of crypto-processors 312 and management of secret keys 322.

It is appreciated that the secure data path 310 of data storage device 300 is not limited to a single data stream and may be operative to simultaneously process multiple data streams. Thus, multiple applications of host 302 may each open a data stream to access portions of storage memory 308 allocated to that application. Storage memory manager 314 is preferably operative to control data accesses of each data stream to storage memory 308. It is appreciated that each data stream may include a different combination of algorithms and different secret keys 322 may be utilized by each algorithm/data stream combination.

It is further appreciated that control CPU 318 is also preferably operative to optimize the utilization of crypto-processors 312, such as by giving a higher priority to relatively slower crypto-processors 312 than relatively faster crypto-processors 312. Additionally, control CPU 318 may be operative to control a crypto-processor 312 so that a functionality included therein is executed multiple times, if required, using the same or different secret keys 322.

It will be appreciated by persons skilled in the art that the present invention is not limited to what has been particularly shown and described hereinabove. Rather the scope of the invention includes both combinations and subcombinations of the various features described hereinabove as well as modifications and variations thereof which would occur to persons skilled in the art upon reading the foregoing description and which are not in the prior art.

The invention claimed is:

1. A method and a device for data storage comprising:
   performing in a data storage device that includes:
   a storage memory,
   a storage memory manager,
   a host interface,
   a secure data path between said host interface and said storage memory, said secure data path including two or more cryptographic processors (crypto-processors) arranged in series along the secure data path,
   a main Central Processing Unit (CPU) configured to manage operations of the data storage device and to direct the storage memory manager to transfer data to and from the storage memory via the secure data path, and
   a control CPU that is configured to consume less power than the main CPU, wherein the control CPU does not perform the operations of the main CPU and wherein the Control CPU is configured to control the two or more cryptographic processor;
   transferring data to and from a host to said host interface by:
   transferring data to and from the storage memory, under control of the main CPU via said storage memory manager, wherein the transferring is performed via the secure data path;
   performing encryption operations under control of the control CPU, using the two or more cryptographic engines in series, wherein said control CPU has access to secret keys required to control operation of said secure data path and said main CPU does not have access to said secret keys; and placing the main CPU in an idle mode such that the main CPU does not consume an appreciable amount of power for at least a period of time while encryption operations are performed under control of the control CPU.

2. The method for data storage according to claim 1, wherein said secure data path includes software with one or more algorithms, including: AES (Advanced Encryption Standard), DES (Data Encryption Standard), 3DES (Triple DES), SHA1 (Secure Hash Algorithm 1), SHA256 (Secure Hash Algorithm 256), SHA384 (Secure Hash Algorithm 384), SHA512 (Secure Hash Algorithm 512) and RC4 (Rivest Cipher 4).

3. The method for data storage according to claim 1, wherein the performing encryption operations using the two or more cryptographic engines in series comprises storing data in a Random Access Memory (RAM) and retrieving data from the RAM.

4. A device for data storage comprising:
   a storage memory,
   a storage memory manager,
   a host interface,
   a secure data path between said host interface and said storage memory;
   two or more cryptographic processors (crypto-processors) arranged in series along the secure data path,
   a main Central Processing Unit (CPU) configured to manage operations of the device and to direct the storage memory manager to transfer data to and from the storage memory via the secure data path, and
   a control CPU that is configured to consume less power than the main CPU, wherein the control CPU does not perform the operations of the main CPU and wherein the Control CPU is configured to perform encryption operation on the data transferred via the secure data path using the two or more crypto-processors in series, wherein said control CPU has access to secret keys required to control operation of said secure data path and said main CPU does not have access to said secret keys;
   wherein the main CPU is configured to operate in an idle mode such that the main CPU does not consume an appreciable amount of power for at least a period of time while the control CPU performs encryption operations.

5. The device for data storage according to claim 4, further comprising:
   a Random Access Memory (RAM) operative to store data output from a first crypto-processor and operative to provide input to a second crypto-processor.

* * * * *